United States Patent [19]

Gruber

[11] 4,175,249

[45] Nov. 20, 1979

[54] SELF-RECONFIGURING SOLAR CELL SYSTEM

[75] Inventor: Robert P. Gruber, North Olmsted, Ohio

[73] Assignee: The United States of America as represented by the Administrator of the National Aeronautics and Space Administration, Washington, D.C.

[21] Appl. No.: 916,655

[22] Filed: Jun. 19, 1978

[51] Int. Cl.² .......................... H02J 7/34; G05F 1/62
[52] U.S. Cl. ....................................... 323/15; 307/63; 307/66; 323/19
[58] Field of Search .................. 323/8, 15, 16, 19, 80; 302/59, 63, 66; 136/89 AC

[56] References Cited

U.S. PATENT DOCUMENTS

| | | | |
|---|---|---|---|
| 3,430,127 | 2/1969 | Weiss | 323/15 |
| 3,636,539 | 1/1972 | Gaddy | 136/89 AC |
| 3,696,286 | 10/1972 | Ule | 323/15 |
| 3,896,368 | 7/1975 | Rym | 323/15 |

Primary Examiner—A. D. Pellinen
Attorney, Agent, or Firm—Norman T. Musial; John R. Manning; Gene E. Shook

[57] ABSTRACT

A self-reconfiguring solar cell array wherein some of the cells are switched so that they can be either in series or in shunt within the array. This feature of series or parallel switching of cells allows the array to match the load to achieve maximum power transfer. Automatic control is used to determine the conditions for maximum power operation and to switch the array into the appropriate configuration necessary to transfer maximum power to the load.

7 Claims, 7 Drawing Figures

SELF-RECONFIGURING SOLAR CELL SYSTEM

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The present invention relates generally to solar cell arrays and more particularly to systems including solar cell arrays and means for controlling the performance of the solar cell arrays.

Solar array power systems do not have the capability of utilizing the full power available from a solar array unless they incorporate a maximum power tracker. Previous maximum power trackers were devices that matched the solar array to the load to achieve operation at the array maximum power point. In doing this power was lost due to power regulator inefficiency.

SUMMARY OF THE INVENTION

Accordingly, it is one object of this invention to provide an improved solar cell system.

It is another object of this invention to provide an improved solar cell system wherein a solar array is automatically reconfigured to match a load.

It is a further object of this invention to provide an improved solar cell system wherein maximum available array power is supplied to a load when demanded.

The objects of the present invention are accomplished by providing a self-reconfiguring solar cell system comprising an array of solar cells, the maximum power loading voltage $V_L$ of each cell being a relatively constant fraction of the open circuit voltage $V_{oc}$ of the cell for all ambient temperature and illumination levels within practical usage bounds; controllable switch means for interconnecting the solar cells in a plurality of series-parallel arrangements; sensor means for determining the magnitude of $V_{oc}$ for the ambient temperature and illumination level in use; and means responsive to the determination of the magnitude of $V_{oc}$ for controlling the switch means to interconnect the solar cells in a series-parallel arrangement to cause each cell in the array to operate at substantially the maximum power loading voltage $V_L$.

In another aspect, the present invention involves a method of reconfiguring an array of solar cells to transfer maximum power to a load, the maximum power loading voltage $V_L$ of each cell being a relatively constant fraction of the open circuit voltage $V_{oc}$ of the cells for all ambient temperature and illumination levels within practical usage bounds, comprising interconnecting the solar cells in a first series-parallel arrangement; determining the magnitude of $V_{oc}$ for the ambient temperature and illumination level in use; multiplying the magnitude of $V_{oc}$ by the constant fraction to determine the magnitude of $V_L$; determining the magnitude $V_A$ of the loaded array voltage; dividing the magnitude of $V_A$ by the magnitude of $V_L$ to determine the number of solar cells in the array to be connected in series to cause each cell in the array to operate at substantially the maximum power loadng voltage $V_L$; determining the total number of solar cells connected in series in the first series-parallel arrangement; subtracting the number of solar cells to be connected in series to cause each cell to operate at substantially $V_L$ from the total number of solar cells connected in series in the first series-parallel arrangement to determine the number of series solar cells that need to be added or subtracted from the array; and interconnecting the solar cells in a second series-parallel arrangement wherein the required number of series solar cells has been added or subtracted from the array so that each cell is caused to operate at substantially the maximum power loading voltage $V_L$.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
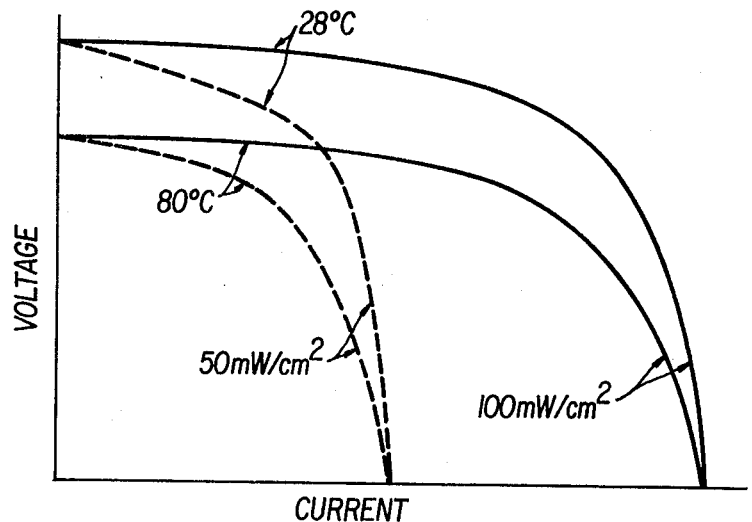
FIG. 1 is a graph of solar cell characteristic curves of voltage versus load current for different values of temperature and illumination.

Referring now to the drawings, wherein like reference numerals designate identical or corresponding parts throughout the several figures, the characteristic curves of voltage versus load current of a typical solar cell for different values of temperature and illumination, are indicated in FIG. 1. An examination of this figure reveals that those curves of equal temperature but of different levels of illumination have essentially the same open circuit voltage, whereas those having equal levels of illumination but different levels of temperature have essentially the same short circuit current. It is also apparent that the open circuit voltage $V_{oc}$ increases as temperature decreases, whereas the short circuit currents vary almost directly with illumination levels. A further observation is that the maximum available power increases with increasing illumination and decreasing cell temperatures.

Figure 2:
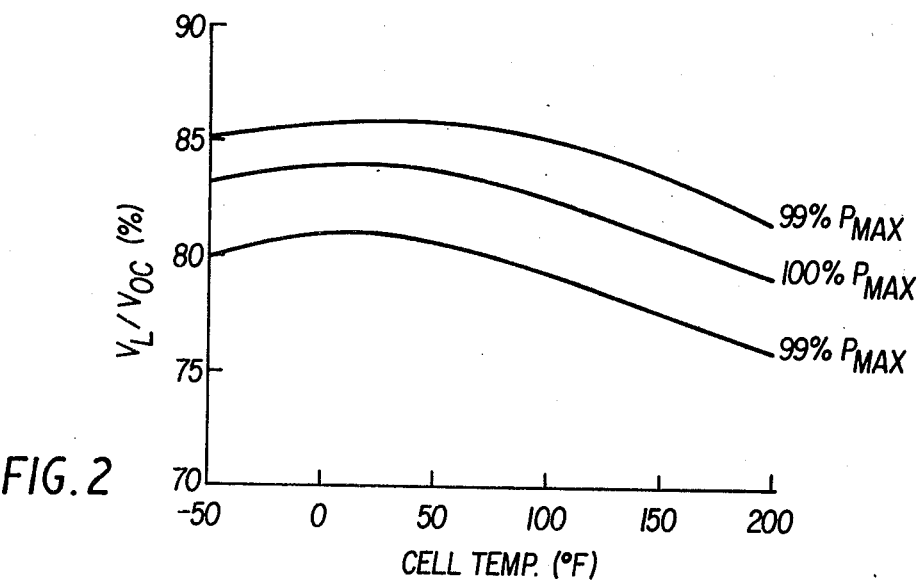
FIG. 2 is a graph of the variation of the ratio of the maximum power loading voltage to the open circuit voltage for a particular solar cell over the range of cell temperatures.

Further, as shown in FIG. 2, the loaded cell voltage at maximum power loading is a relatively constant fraction of open circuit voltage for all ambient temperature and illumination levels within practical usage bounds. It will be appreciated that the term loaded cell voltage at maximum power loading is used herein in a conventional sense as the voltage of a cell when the load is matched to the internal impedance of the solar cell. FIG. 2 shows for a particular P/N solar cell how the ratio of the maximum power loading voltage $V_L$ to the open circuit voltage $V_{oc}$ varies over the range of cell temperatures. Also indicated are the ratios of these same voltages for the two 99% power levels corresponding to an under (top curve) or an over (lower curve) loaded cell. Therefore, if a fixed ratio of 0.83 of the maximum power loading voltage to the open circuit voltage could be maintained at all temperatures within $-50°$ F. to $200°$ F., the actual resultant power loading would remain within $\pm 1\%$ of the maximum power available at a given temperature for fixed illumination, even though the maximum differ for each temperature. Furthermore, when the ratio of 0.83 is maintained and the illumination level is varied from 20 mW/cm$^2$ 140 mW/cm$^2$, the actual resultant power loading is well within 1% of the maximum power available.

Figure 3:
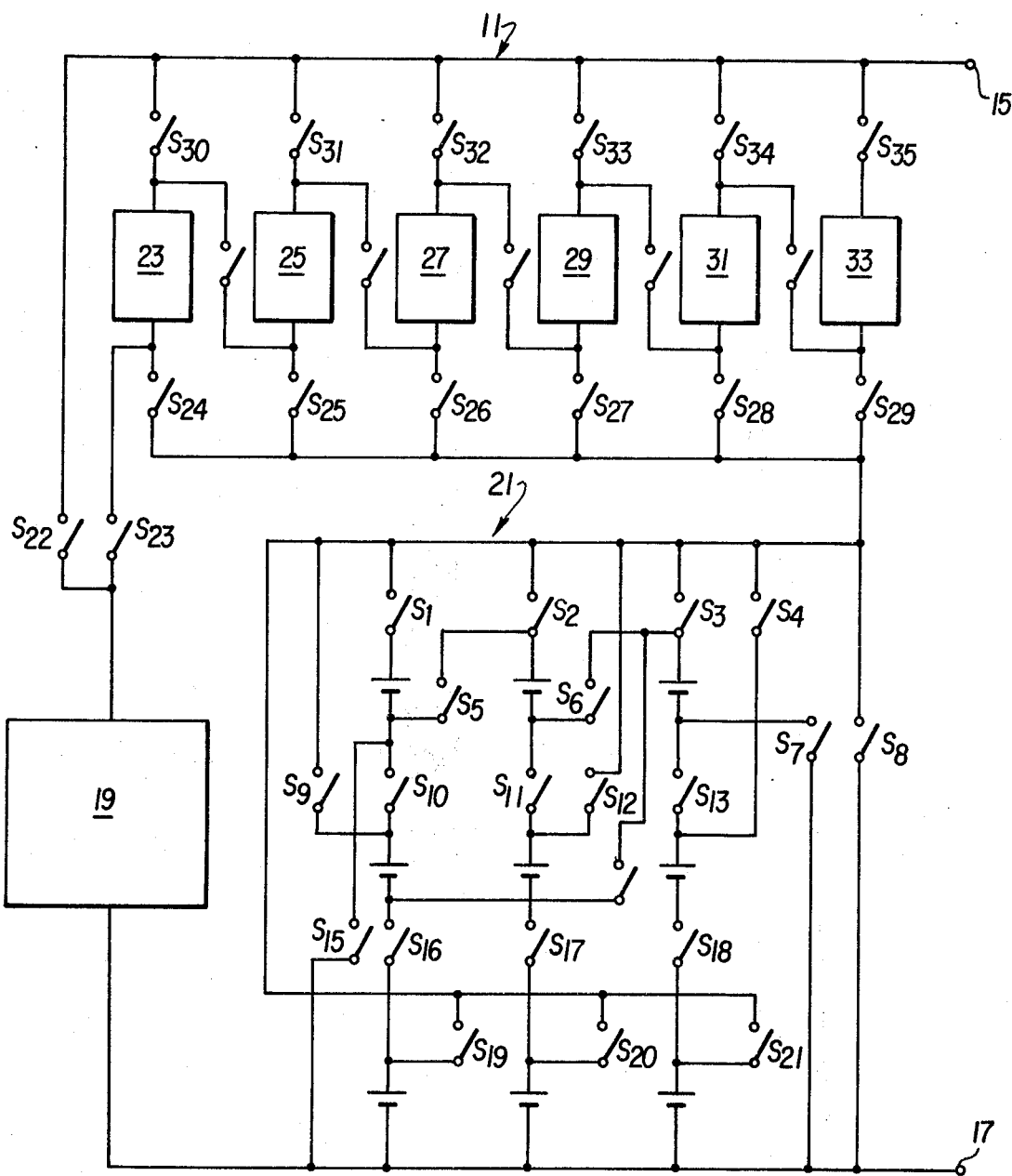
FIG. 3 is a block diagram of the reconfigurable array of solar cells according to an embodiment of the invention.

FIG. 3 shows in block form a reconfigurable array 11 of solar cells according to an embodiment of the invention. The solar cells of the array 11 provide a voltage output between a positive terminal 15 and a negative terminal 17. For purposes of illustration, the array is assumed to consist of 625 identical solar cells, in combination with a switching circuit, the switches of the switching circuit conveniently constituted by a plurality of single pole, single throw latching relays for connecting some of the cells either in series or in shunt within the array. In this way the array voltage can be increased by decreasing the array current capability. Conversely, the array current capability can be increased at the cost of a decrease in array voltage. This feature of series or parallel switching of cells allows the array to match the load to achieve maximum power transfer.

The array 11 is seen to consist of a non-reconfigurable array segment of 22 connected columns of 22 series connected solar cells (that is, 22 cells in series and 22 cells in parallel) represented by block 19, and a reconfigurable array segment including a block 21 of 9 solar cells, and six identical blocks 23, 25, 27, 29, 31 and 33 of 22 solar cells each. Switches designated $S_1$ through $S_{21}$ are provided to switch one series-parallel arrangement of the 9 solar cells in block 21 to another series-parallel arrangement in response to commands from a control circuit hereinafter described. The reconfigurable series-parallel arrangements of the 9 solar cells in block 21 are summarized in Table 1.

TABLE 1

| CELLS IN SERIES | CELLS IN PARALLEL |
|---|---|
| 0 | 0 |
| 1 | 5 |
| 2 | 4 |
| 3 | 3 |
| 4 | 2 |
| 5 | 1 |

Figure 4:
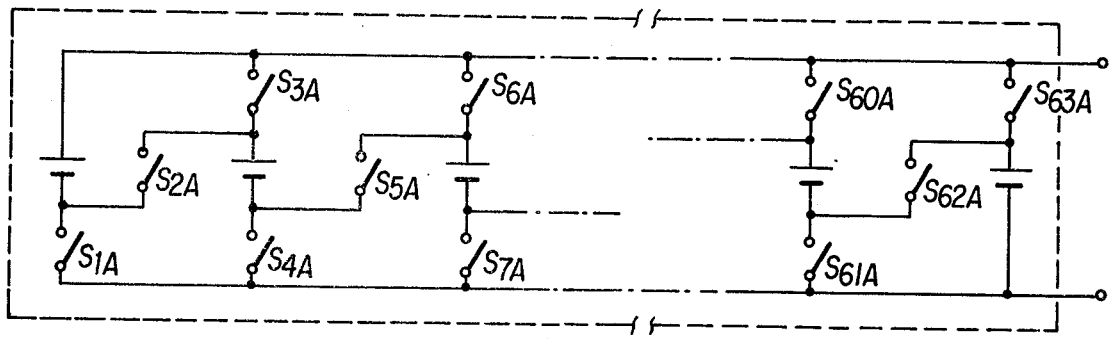
FIG. 4 is a schematic diagram of one of the blocks in FIG. 3.

FIG. 4 shows one of the six identical blocks 23, 25, 27, 29, 31 and 33 as illustrative of other such elements. Switches $S_{1A}$ through $S_{63A}$ are provided to switch the 22 solar cells in the block between the two series-parallel arrangements summarized in Table 2.

TABLE 2

| CELLS IN SERIES | CELLS IN PARALLEL |
|---|---|
| 22 | 1 |
| 1 | 22 |

Returning to FIG. 3, Switches $S_{22}$ through $S_{35}$ are provided to cooperate with the other switches of the array to reconfigure the entire solar cell array into seven reconfiguration states. This is summarized in Table 3.

TABLE 3

| Reconfiguration State | Cells In Series | Cells In Parallel | Total Cells Used |
|---|---|---|---|
| 1 | 22 | 28 | 616 |
| 2 | 23 | 27 | 621 |
| 3 | 24 | 26 | 624 |
| 4 | 25 | 25 | 625 |
| 5 | 26 | 24 | 624 |
| 6 | 27 | 23 | 621 |
| 7 | 28 | 22 | 616 |

Figure 5:
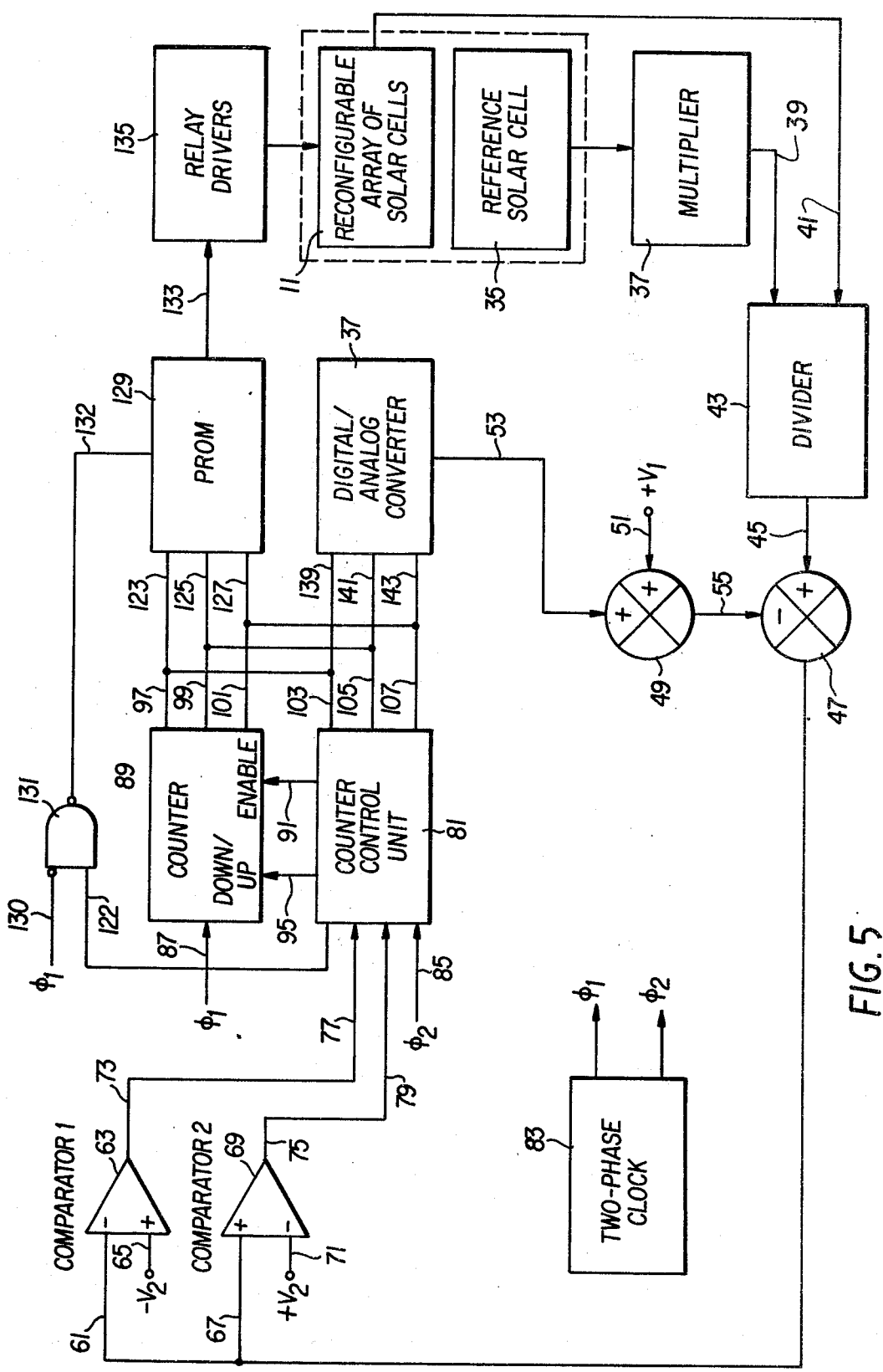
FIG. 5 is a block diagram of the self-reconfiguring solar cell system according to this invention.

Referring to FIG. 5, the self-reconfiguring solar cell system of the invention is illustrated as incorporating the above-described reconfigurable array 11 of solar cells. Automatic control is used to determine the conditions for maximum power operation and to switch the array 11 into the appropriate configuration necessary to transfer maximum power to a load connected between terminal 15 and terminal 17. The control circuit makes use of the following property of solar cells. At the point of maximum power loading by a solar cell, the ratio of the cell voltage to the open circuit voltage is virtually constant (0.83) for all practical operating conditions.

A sensor solar cell 35 is mounted into the reconfigurable array 11 so that the sensor cell is always at the same temperature as the array and has the same illumination. The sensor solar cell open circuit voltage $V_{oc}$ multiplied by a constant (0.83) is equal to the maximum power loading voltage of the cell. For maximum power output, it is necessary that each cell in the array operate at the sensor cell maximum power loading voltage.

The control circuit reconfigures the array so that each solar cell operates at a voltage output approximately equal to the maximum power loading voltage of the sensor solar cell. Therefore each cell in the solar array operates at its maximum power output.

Referring again to FIG. 5, there is provided a multiplier 37, which can be a voltage divider having a high total resistance, for connection to the output terminals of the sensor solar cell 35 to furnish an output signal which represents a value equivalent to the product of the open circuit voltage $V_{oc}$ of the sensor solar cell and the constant fraction (0.83) that is, the maximum power loading voltage of the cell. This signal, and a signal fed from the output terminals of the solar cell array 11 which represents the loaded array voltage $V_a$, are fed to the inputs 39 and 41 of analog divider 43. The divider 43 is preferably a conventional integrated circuit commercially available as a model 4291k from Burr-Brown Inc. The analog divider 43 furnishes a signal at its output which represents the quotient of the values represented by the two input signals, that is, the number of solar cells in the array to be connected in series so that each cell operates at the sensor cell maximum power loading voltage. As stated above, when each cell operates at this voltage, maximum power is transferred to the load.

The signal developed at the output of the analog divider 43 is then fed to input 45 of a difference amplifier 47. A circuit represented by numeral 49 is a summing amplifier which receives at its input 51 a signal $V_1$ from a reference voltage source which represents the number (22) of cells connected in series in the non-configurable array segment 19, and at its input 53 a signal which represents the variable number of cells connected in series in the reconfigurable array segment. Therefore, it develops a signal at its output which represents the total number of solar cells connected in series in array 11. This signal is fed to the other input 55 of the difference amplifier 47. The difference amplifier furnishes an error signal at its output which represents the difference of the values represented by the two input signals, that is, the number of series solar cells that need to be added or subtracted from the array to transfer maximum power to the load.

The error voltage is fed to the inverting input 61 of a comparator 63 having its non-inverting input 65 connected to a negative reference voltage source $-V_2$. The error voltage is also fed to the non-inverting input 67 of a comparator 69 having its inverting input 71 connected to a positive reference voltage source $+V_2$. The comparators are operational amplifiers which compare an input voltage to a reference voltage. When the input signal is slightly greater than the reference voltage, the operational amplifier swings into positive saturation. When the input is slightly less than the reference voltage the operational amplifier swings into negative saturation. The signals developed at the outputs 73 and 75 are then fed to the inputs 77 and 79 respectively of a counter control unit 81. When the error signal is negative, indicating that series solar cells need to be added to the array, the outputs 73 and 75 are both high. When the error signal is positive, indicating that series solar cells need to be subtracted from the array, the outputs 73 and 75 are both low. When the error signal is substantially nulled, that is it lies within a small deadband around zero error signal, the output 73 is low and the output 75 is high.

Figure 7:
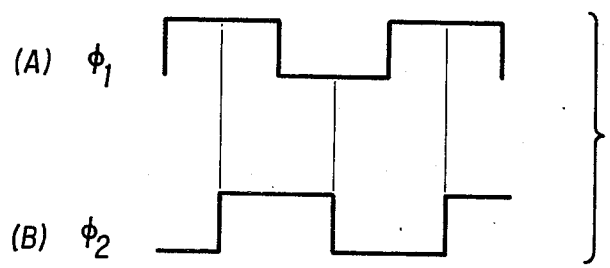
FIGS. 7(a), (b) are the phase waveforms of the two phase clock.

The circuit represented by the numeral 83 is a conventional two-phase clock having phase waveforms $\phi_1$ and $\phi_2$ shown in FIGS. 7(a) and 7(b) respectively. For example, clock 83 could be a Signetics Model 555 multivibrator followed by two JK flip-flops. Waveform $\phi_2$ is fed to input 85 of counter control unit 81, and waveform $\phi_1$ is fed to the clock input 87 of an up-down counter 89, which may be, for example, a Texas Instruments Type SN 74191 synchronous up-down counter with down-up mode control. The counter 89 is triggered on a low-to-high level transition of the clock input 87 if the enable input 91 is low. A high at the enable input 91 inhibits counting. The direction of the count is determined by the level of the down/up input 95. When low, the counter 89 counts up and when high, it counts down. The three bits of the counter which are produced at its outputs 97, 99 and 101 are used to store a binary code of each of the seven array reconfiguration states summarized in Table 3. Table 4 summarizes the counter state assignments.

TABLE 4

| State Of Up-Down Counter | Cells In Series |
|---|---|
| 000 | 22 |
| 001 | 23 |
| 010 | 24 |
| 011 | 25 |
| 100 | 26 |
| 101 | 27 |
| 110 | 28 |

Figure 6:
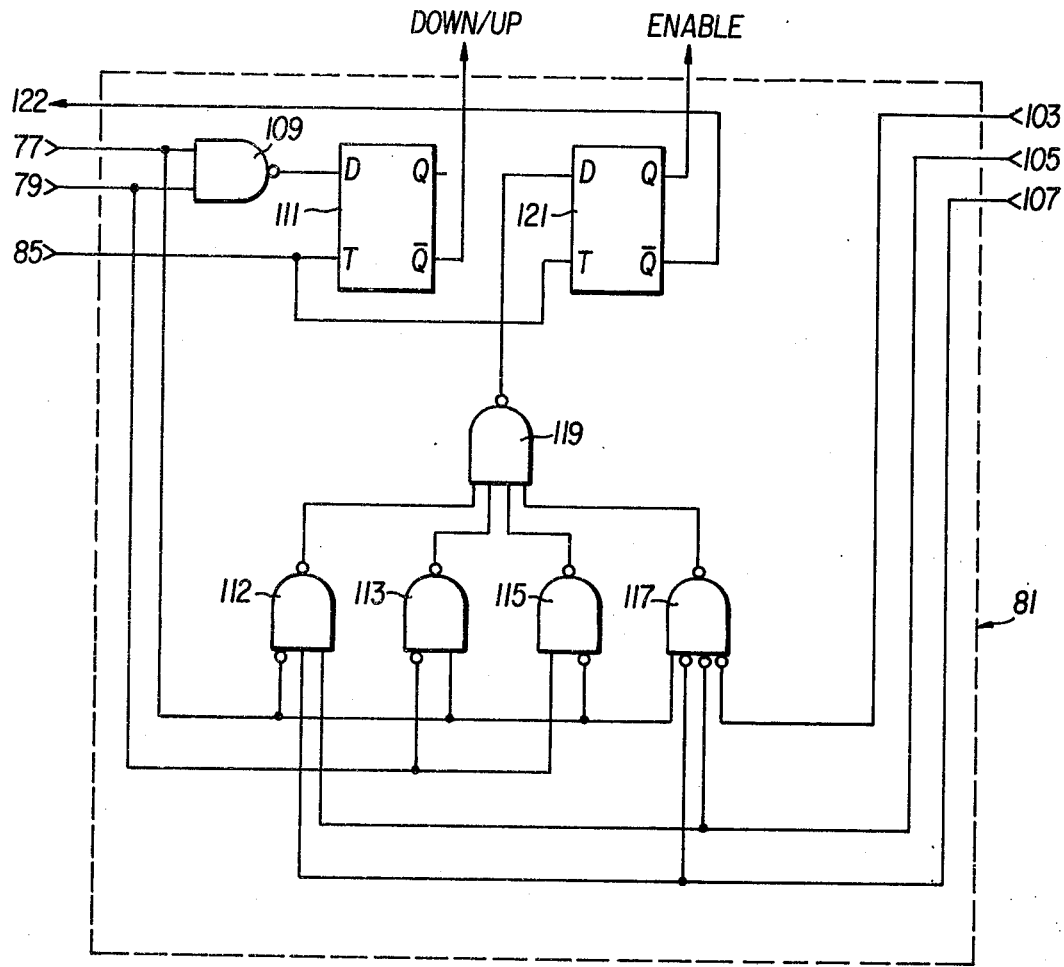
FIG. 6 is a schematic circuit diagram of the counter control circuit.

The binary code developed by the counter 89 is fed to the inputs 103, 105 and 107 of the counter control unit 81, which is shown in detail in FIG. 6. The counter control unit includes means for causing the counter to count up and count down and means for stopping and starting the counter.

The means for causing the counter to count up includes AND gate 109, wherein the small circle connected to the output of the AND gate signifies the inversion function, and D flip-flop 111. Gate 109 receives inputs from each of the comparators 63 and 69. The output of this gate is connected to the D input of the D-flip flop 111 which has its clock input driven by waveform $\phi_2$. The Q output of the D flip-flop 111 feeds the down/up input 95 of counter 89. When the error signal is negative, a low level appears at the down/up input 95 of the counter 89 in synchronism with the leading edge of waveform $\phi_2$ and the counter increases its count. When the error signal is positive, a high level appears at the down/up input 95 of the counter 89 in synchronism with the leading edge of waveform $\phi_2$ and the counter decreases its count.

The means for stopping and starting the counter includes the AND gates 112, 113, 115, 117 and 119, wherein small circles connected to the input and output terminals of these AND gates signify the inversion function, and D flip-flop 121. Gate 112 receives inputs from comparator 63, and the outputs 99, 101 of counter 89. Gates 113 and 115 receive inputs from each of the comparators 63 and 69. Gate 117 receives inputs from comparator 63 and the outputs 97, 99, 101 of counter 89. The outputs of each of the gates 112, 113, 115 and 117 are connected to a respective input of gate 119. The output of this gate is connected to the D input of the D flip-flop 121 which has its clock input driven by waveform $\phi_2$. The Q output of the D flip-flop 121 feeds the enable input 91 of the counter 89. The Q output of the D flip-flop 121 feeds input 122 of the AND gate 131, wherein the small circles connected to the input and output of the AND gate signify the inversion function. A high level appears at the enable input 91 of the counter 89 in synchronism with the leading edge of waveform $\phi_2$ and stops the counter when the following conditions occur: (1) the counter state reaches 000 and the count direction is down (less series cells required); (2) the counter state reaches 110 and the count direction is up (more series cells required); and (3) the error signal lies within the deadband.

The binary code developed by the counter 89 is also fed to the address inputs 123, 125 and 127 of a Programmable Read Only Memory (PROM) 129 which may comprise, for example. Texas Instruments Type SN 74188A memories. Waveform $\phi_1$ is fed to input 130 of gate 131 which furnishes a signal to input 132 of the PROM 129 so that the latter is addressed by the three bits of counter 89 on the trailing edge of waveform $\phi_1$. The PROM decodes the counter states and develops control signals at its output 133 which are fed to relay drivers 135. The relay drivers then actuate the necessary switches to achieve the array configuration according to Table 4. By synchronizing array switching with the clock, relay switching power pulses are sent only when array configuration is necessary. This conserves power.

Further, the circuit represented by numeral 137 is a conventional digital to analog converter which receives the binary code developed by counter 89 at its inputs 139, 141 and 143. The digital to analog converter then furnishes a signal at the input 53 of summing amplifier 49 which represents the variable number of cells connected in series in the reconfigurable array segment.

In operation, if the error signal is positive, the system increases the number of series cells by one and reduces the string of parallel cells by one. After the next clock period, if the error signal is still positive, the series cells are again increased by one and the string of parallel cells is reduced by one. The array 11 is reconfigured one step at a time until the error signal is in the range of zero plus or minus several millivolts. This small deadband around zero error signal prevents continuous cycling since the array is reconfigured in discrete steps of one cell. The array is reconfigured one step at a time so that it is not necessary to predict the interaction of the array with load nonlinearities and change in array current capability with each reconfiguration. Once the error signal is in the deadband, reconfiguration stops. If the error signal is negative, the number of series cells is reduced by one and the string of parallel cells is increased by one. A capacitor (not shown) across the array supplies energy to the load during the switching interval.

Obviously, numerous additional modifications and variations of the present invention are possible in light of the above teachings. For example, it is clear from the "Total Cells Used" column of Table 3 that all of the cells of the embodiment of the reconfigurable array of FIG. 3 cannot always be used. The percentage of the power lost because of the unused cells is $$\frac{625 - 616}{625} \times 100 = 1.4\% \text{ worst case.}$$

Another design could improve the percentage of the power lost but at the cost of greatly increased complexity. One possibility is to replace some of the 625 cells by reconfigurable modules of cells to achieve better performance. In addition it is also evident that many of the single pole single throw relays could be replaced by multiple pole, multiple throw latching relays to achieve a simpler system. It is therefore to be understood that within the scope of the appended claims, the invention may be practiced otherwise than as specifically described herein.

What is claimed as new and desired to be secured by letters patent of the United States is:

1. A self-reconfiguring solar cell system comprising:
   an array of solar cells, the maximum power loading voltage $V_L$ of each cell being a relatively constant fraction of the open circuit voltage $V_{oc}$ of the cell for all ambient temperature and illumination levels within practical usage bounds;
   controllable switch means for interconnecting the solar cells in a plurality of series-parallel arrangements;
   sensor means for determining the magnitude of $V_{oc}$ for the ambient temperature and illumination level in use; and
   means responsive to the determination of the magnitude of $V_{oc}$ for controlling the switch means to interconnect the solar cells in a series-parallel arrangement to cause each cell in the array to operate at substantially the maximum power loading voltage $V_L$.

2. The self-reconfiguring solar cell system recited in claim 1 wherein the controlling means includes:
   a multiplier connected to the sensor means for generating a first signal representing a value equivalent to the product of the magnitude of $V_{oc}$ determined by the sensor means and the constant fraction; and
   a divider connected to the array to receive a sound signal representing the loaded array voltage $V_a$ and connected to the multiplier to receive the first signal representing the producing of $V_{oc}$ and the constant fraction for generating a third signal representing the quotient of the values represented by the first signal and the second signal to determine the number of solar cells in the array to be connected in series for causing each cell in the array to operate at substantially the maximum power loading voltage $V_L$.

3. The self-reconfiguring solar cell system recited in claim 2 wherein the controlling means includes:
   sum means for generating a fourth signal representing the total number of solar cells connected in series in the array; and
   difference means connected to the divider to receive the third signal representing the number of solar cells in the array to be connected in series and connected to the sum means to receive the fourth signal representing the total number of solar cells connected in series in the array for generating an error signal representing the difference of the values represented by the third and fourth signals to determine the number of series solar cells that need to be added or subtracted from the array for causing each cell in the array to operate at substantially the maximum power loading voltage $V_L$.

4. The self-reconfiguring solar system recited in claim 3 wherein the controlling means includes:
   comparator means connected to the difference means to receive the error signal for generating a fifth signal indicating that solar cells need to be added or subtracted from the array.

5. The self-reconfiguring solar cell system recited in claim 4 wherein the controlling means includes:
   a clock for generating clock pulses;
   an up-down counter connected to the clock for counting clock pulses to generate a binary word; and
   counter control means connected to the clock, the counter and to the comparator means and responsive to the clock pulses, the generating of the binary word and the fifth signal for causing the counter to count clock pulses until the error signal is substantially nulled.

6. The self-reconfiguring solar cell system recited in claim 5 wherein the controlling means includes:
   means for converting the binary word generated by the up-down counter into control signals for controlling the switch means to interconnect the solar cells in series-parallel arrangement to cause each cell in the array to operate at substantially the maximum power loading voltage $V_L$.

7. A method of reconfiguring an array of solar cells to transfer maximum power to a load, the maximum power loading voltage $V_L$ of each cell being a relatively constant fraction of the open circuit voltage $V_{oc}$ of the cells for all ambient temperature and illumination levels within practical usage bounds, comprising:
   interconnecting the solar cells in a first series-parallel arrangement;
   determining the magnitude of $V_{oc}$ for the ambient temperature and illumination level in use;
   multiplying the magnitude of $V_{oc}$ by the constant fraction to determine the magnitude of $V_L$;
   determining the magnitude $V_A$ of the loaded array voltage;
   dividing the magnitude of $V_A$ by the magnitude of $V_L$ to determine the number of solar cells in the array to be connected in series to cause each cell in the array to operate at substantially the maximum power loading voltage $V_L$;

determining the total number of solar cells connected in series in the first series-parallel arrangement;

subtracting the number of solar cells to be connected in series to cause each cell to operate at substantially $V_L$ from the total number of solar cells connected in series in the first series-parallel arrangement to determine the number of series solar cells that need to be added or subtracted from the array; and interconnecting the solar cells in a second series-parallel arrangement wherein the required number of series solar cells has been added or subtracted from the array so that each cell is caused to operate at substantially the maximum power loading voltage $V_L$.

* * * * *